UNITED STATES PATENT OFFICE.

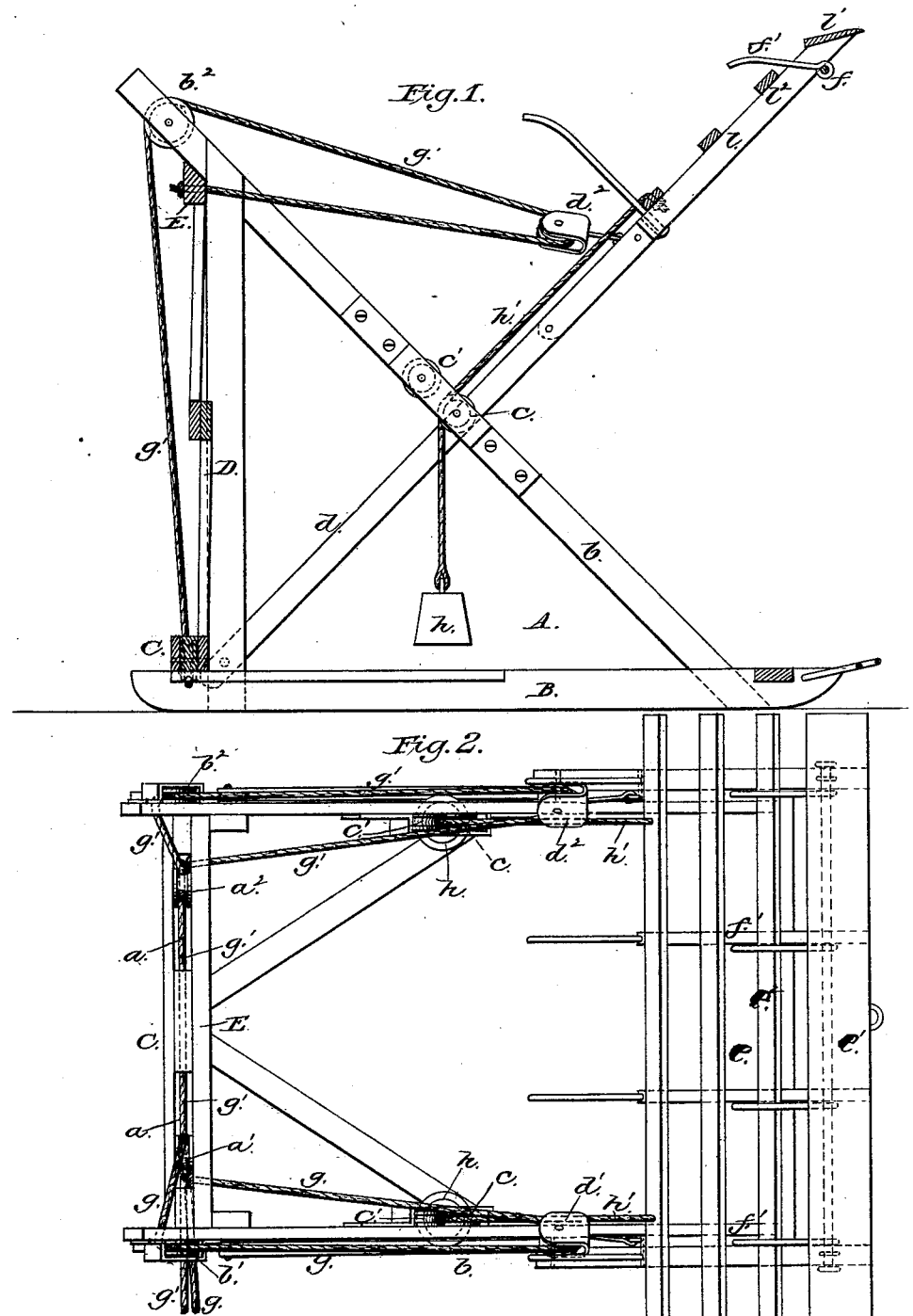

JOHN E. KIRK, OF SALISBURY, MISSOURI.

HAY RICKING AND LOADING DEVICE.

SPECIFICATION forming part of Letters Patent No. 229,424, dated June 29, 1880.

Application filed May 21, 1879.

*To all whom it may concern:*

Be it known that I, JOHN E. KIRK, of Salisbury, in the county of Chariton and State of Missouri, have invented certain new and useful Improvements in Hay Ricking and Loading Devices; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to make improvements on the devices shown in Letters Patent No. 169,542, November 2, 1875, and No. 186,007, January 9, 1877, granted to John R. Hill.

It consists in the construction and arrangement of the several parts hereinafter described, and pointed out in the claim.

In the drawings, Figure 1 is a vertical longitudinal section, and Fig. 2 is a plan, of a hay-ricker constructed according to my invention.

A is a substantial frame, composed of the sills B, cross-beam C, upright posts D, and cross-bar E, all framed and staunchly braced together. The sills have their ends beveled in sled-runner form, and are provided with suitable hitching devices, so that the entire frame may be readily moved from place to place.

The cross-beam C has formed in it mortises $a\ a$, in which are placed pulleys $a'\ a^2$, around which are put the operating-ropes.

The upright posts D are about the height of an ordinary hay-stack.

$b\ b$ are two inclined guide-bars, having their upper ends resting on the cross-bar E, and secured firmly to the upper ends of the posts D, while their lower ends extend to and are secured to the sides of the outer ends of the sills B. They are arranged at the sides of the frame A, and have on their upper ends the pulleys $b'\ b^2$, as shown.

$c\ c'$ are pulleys placed on the inner side and midway between the ends of the guide-bars $b$.

The arms $d\ d$ have their ends hinged to the outside of the frame A at the joining of the sills B and posts D, so that as they are raised or lowered they slide against the outer sides of the guide-bars $b$, which prevent any lateral moving or swaying. To the outer ends of the arms $d$ are attached the pulleys $d'\ d^2$, and also the hay-platform $e$.

Immediately under the bridge-board $e'$ I attach a roller, $f$, provided with fingers $f'$, which extend upward between the said bridge-board and the next cross-bar $e^2$, as shown. When the hay is being drawn onto the platform the fingers $f'$ lie almost flat on the top of the platform. When the rake is being drawn back off the platform the hay is often drawn with it; but in my device the reverse movement of the rake will raise the fingers $f'$ to a vertical position against the edge of the bridge-board and prevent the hay from being drawn off.

I employ two elevating-ropes, $g\ g'$. These ropes have one of their ends firmly attached to the top cross-bar, E, while their opposite ends are carried around the sheaves $d'\ d^2$, thence over the sheaves $b'\ b^2$ on the upper ends of guide-bars $b\ b$, thence down under the sheaves $a'\ a^2$, as shown. The end of the rope $g'$ is carried from the sheave $a^2$ along under the cross-beam C, past the pulley $a'$, and out at a suitable hole in the sill B, together with the end of the rope $g$, so that both ropes are thus united and attached to the same device to which the horse is hitched.

By the arrangement of the ropes and the guide-bars $b\ b$, as described, the platform $e$ will be elevated with a steadier movement and with less liability to get out of order by the swaying in ordinary machines, caused when the weight of hay is greater on one end of said platform than on the other.

$h$ are weights supported on the ropes $h'$, which are passed between the pulleys $c\ c'$ and fastened to the inner side of the platform $e$. This weight is made lighter, so that it is slightly overbalanced by the weight of the platform $e$, so that the latter will fall gently of its own gravity to the ground after the hay has been discharged.

When the platform is loaded the weight $h$ gives very material aid in the first movement of raising the hay, for the horse does not have to lift but very little of the weight of the platform.

When the arms $b$ and platform $e$ are raised to an angle of about forty-five degrees the rope $h'$ lets the weights drop on the sills or ground, and they exercise no influence on the load till the said arms have been drawn up about three-fourths the entire distance. Then the weights are again lifted; but the arms and platform are so nearly the perpendicular that the backward action of said weights is not materially felt. After the hay has been discharged the weights draw the platform back, and it falls gently to the ground into position to receive a new load.

The fingers $f'$ may be attached to the under supporting-bars of the platform, so that each will move independently of the others; but I prefer to attach all of them to the same axis $f$, and thus give to all a simultaneous action.

Having thus fully described my invention, what I claim as new, and desire to secure by Letters Patent, is—

In a hay-ricking machine, the combination, with the platform $e$, composed of bridge-board $e'$ and cross-bars $c^2$, of the roller $f$, secured below the bridge-board $e$ and provided with a series of fingers, $f'$, which extend upward between the said bridge-board and the cross-bar next thereto, substantially as and for the purposes set forth.

In testimony that I claim the foregoing as my own I affix my signature in presence of two witnesses.

JOHN E. KIRK.

Witnesses:
WILLIAM S. STOCKWELL,
WILLIAM S. COLEMAN.